United States Patent
Sumou et al.

(10) Patent No.: US 8,032,677 B2
(45) Date of Patent: Oct. 4, 2011

(54) SELECTION CIRCUIT AND PACKET PROCESSING APPARATUS

(75) Inventors: Takeshi Sumou, Fukuoka (JP); Katsumi Imamura, Fukuoka (JP); Hideyo Fukunaga, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/507,872

(22) Filed: Jul. 23, 2009

(65) Prior Publication Data
US 2010/0082864 A1 Apr. 1, 2010

(30) Foreign Application Priority Data
Sep. 30, 2008 (JP) .................................. 2008-255315

(51) Int. Cl.
*G06F 13/26* (2006.01)
(52) U.S. Cl. ................ 710/111; 710/240; 710/200
(58) Field of Classification Search .......... 710/240–244, 710/200, 111
See application file for complete search history.

(56) References Cited

U.S. PATENT DOCUMENTS
6,665,760 B1* 12/2003 Dotson .......................... 710/240
2002/0178311 A1* 11/2002 Liu et al. ...................... 710/240

FOREIGN PATENT DOCUMENTS
JP 2003-179632 6/2003

* cited by examiner

*Primary Examiner* — Matthew D Spittle
*Assistant Examiner* — Kim Huynh
(74) *Attorney, Agent, or Firm* — Murphy & King, P.C.

(57) ABSTRACT

An aspect of the embodiment utilizes a selection circuit that includes a first storage circuit for storing information of m×n bits each corresponding to a choice. The storage circuit indicates whether the corresponding choice is in a selectable state or not. A first round robin circuit for executing a round robin process on the second storage circuit selects one of the bits contained in the corresponding bit string and indicates that a choice is in a selectable state. A second round robin circuit executes the round robin process on the bit string having the m-bit width to select one of the bits indicating that the corresponding choice, and a control circuit controls the first and the second round robin circuit.

12 Claims, 13 Drawing Sheets

FIG. 2

|  | | 0 | 1 | 2 | 3 | 4 | 5 | 6 | 7 | 8 | 9 | .. | .. | .. | .. | ..m−1 | FF×n |
|---|---|---|---|---|---|---|---|---|---|---|---|---|---|---|---|---|---|
|  | 0 | 0 | 0 | 0 | 0 | 0 | 0 | 0 | 0 | 0 | 0 | 0 | 0 | 0 | 0 | 0 | 0 |
|  | 1 | 0 | 0 | 0 | 0 | 1 | 0 | 0 | 0 | 1 | 0 | 0 | 0 | 0 | 0 | 0 | 1 |
|  | 2 | 0 | 0 | 1 | 0 | 0 | 1 | 1 | 0 | 0 | 0 | 0 | 1 | 1 | 0 | 0 | 1 |
|  | 3 | 0 | 0 | 0 | 0 | 0 | 0 | 0 | 0 | 0 | 0 | 0 | 0 | 0 | 0 | 0 | 0 |
|  | 4 | 0 | 0 | 1 | 0 | 0 | 0 | 0 | 0 | 0 | 0 | 1 | 0 | 0 | 0 | 1 | 1 |
|  | 5 | 0 | 0 | 0 | 0 | 0 | 1 | 0 | 1 | 0 | 1 | 0 | 0 | 1 | 0 | 1 | 0 | 1 |
|  | 6 | 0 | 0 | 0 | 0 | 0 | 0 | 0 | 0 | 0 | 0 | 0 | 0 | 0 | 0 | 0 | 0 |
| n word | 7 | 0 | 0 | 0 | 0 | 0 | 0 | 0 | 0 | 1 | 0 | 0 | 0 | 0 | 0 | 0 | 1 |
|  | 8 | 0 | 0 | 0 | 0 | 0 | 0 | 0 | 0 | 0 | 0 | 0 | 0 | 0 | 0 | 0 | 0 |
|  | 9 | 0 | 0 | 0 | 0 | 0 | 0 | 0 | 0 | 0 | 0 | 1 | 0 | 0 | 0 | 0 | 1 |
|  | ·· | 0 | 0 | 1 | 0 | 1 | 1 | 1 | 0 | 1 | 0 | 0 | 0 | 1 | 1 | 0 | 1 |
|  | ·· | 0 | 0 | 0 | 0 | 0 | 0 | 0 | 0 | 0 | 0 | 0 | 0 | 0 | 0 | 0 | 0 |
|  | ·· | 0 | 0 | 1 | 0 | 0 | 0 | 0 | 0 | 0 | 0 | 0 | 0 | 0 | 0 | 0 | 1 |
|  | ·· | 0 | 0 | 0 | 0 | 0 | 0 | 0 | 1 | 0 | 0 | 0 | 0 | 1 | 0 | 1 | 0 | 1 |
|  | ·· | 0 | 0 | 0 | 0 | 0 | 0 | 0 | 0 | 0 | 0 | 0 | 0 | 0 | 0 | 0 | 0 |
|  | n−1 | 0 | 0 | 0 | 0 | 0 | 0 | 0 | 0 | 0 | 0 | 0 | 0 | 0 | 0 | 0 | 0 |

SERVICE ID (256 BITS)

| | 0 | 1 | 2 | 3 | 4 | 5 | 6 | 7 | 8 | 9 | .. | .. | .. | .. | .. | 256 | | FF×256 |
|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | | 0 |
| 1 | 0 | 0 | 0 | 0 | 1 | 0 | 0 | 0 | 1 | 0 | 0 | 0 | 0 | 0 | 0 | 0 | | 1 |
| 2 | 0 | 0 | 1 | 0 | 0 | 1 | 1 | 0 | 0 | 0 | 0 | 0 | 1 | 1 | 0 | 0 | | 1 |
| 3 | 0 | 0 | 0 | 0 | 0 | 0 | 0 | 0 | 0 | 0 | 0 | 0 | 0 | 0 | 0 | 0 | | 0 |
| 4 | 0 | 0 | 1 | 0 | 0 | 0 | 0 | 0 | 0 | 0 | 1 | 0 | 0 | 0 | 0 | 1 | | 1 |
| 5 | 0 | 0 | 0 | 0 | 0 | 1 | 0 | 1 | 0 | 1 | 0 | 0 | 1 | 0 | 1 | 0 | | 1 |
| 6 | 0 | 0 | 0 | 0 | 0 | 0 | 0 | 0 | 0 | 0 | 0 | 0 | 0 | 0 | 0 | 0 | | 0 |
| 7 | 0 | 0 | 0 | 0 | 0 | 0 | 0 | 0 | 1 | 0 | 0 | 0 | 0 | 0 | 0 | 0 | | 1 |
| 8 | 0 | 0 | 0 | 0 | 0 | 0 | 0 | 0 | 0 | 0 | 0 | 0 | 0 | 0 | 0 | 0 | | 0 |
| 9 | 0 | 0 | 0 | 0 | 0 | 0 | 0 | 0 | 0 | 0 | 0 | 1 | 0 | 0 | 0 | 0 | | 1 |
| .. | 0 | 0 | 1 | 0 | 1 | 1 | 1 | 0 | 1 | 0 | 0 | 0 | 1 | 1 | 0 | 0 | | 1 |
| .. | 0 | 0 | 0 | 0 | 0 | 0 | 0 | 0 | 0 | 0 | 0 | 0 | 0 | 0 | 0 | 0 | | 0 |
| .. | 0 | 0 | 1 | 0 | 0 | 0 | 0 | 0 | 0 | 0 | 0 | 0 | 0 | 0 | 0 | 0 | | 1 |
| .. | 0 | 0 | 0 | 0 | 0 | 0 | 0 | 1 | 0 | 0 | 0 | 0 | 1 | 0 | 1 | 0 | | 1 |
| .. | 0 | 0 | 0 | 0 | 0 | 0 | 0 | 0 | 0 | 0 | 0 | 0 | 0 | 0 | 0 | 0 | | 0 |
| 256 | 0 | 0 | 0 | 0 | 0 | 0 | 0 | 0 | 0 | 0 | 0 | 0 | 0 | 0 | 0 | 0 | | 0 |

USER ID (256 BITS)

SELECTION CIRCUIT AND PACKET PROCESSING APPARATUS

CROSS-REFERENCE TO RELATED APPLICATIONS

This application is based upon and claims the benefit of priority of the prior Japanese Patent Application No. 2008-255315, filed on Sep. 30, 2008, the entire contents of which are incorporated herein by reference.

FIELD

The embodiments relate to a selection circuit of a round robin scheme and a packet processing apparatus that includes the selection circuit. More specifically, the embodiments relate to a selection circuit and a packet processing apparatus operable to suppress the increase in the circuit size of the logic circuit while dealing with a multiplicity of choices.

BACKGROUND

In the conventional selection circuit for selecting from among a plurality of choices, a round robin circuit is often used as a logic circuit. One example of a selection circuit used for a packet processing apparatus is shown in FIG. 13. In particular, a selection circuit 100 shown in FIG. 13 includes a round robin circuit 102, which in turn sequentially selects and outputs the packets stored in four queues 101.

In recent years, a great number of queues have come to be used in a packet processing apparatus to realize features such as a band control function. The selection circuit used for selection of these queues is required to rapidly select from among a multiplicity of choices. To meet this requirement, a selection circuit is known, in which a plurality of round robin circuits are connected to each other through a loop-like search path. Each round robin circuit is controlled by a control unit, for example as disclosed by Japanese Unexamined Patent Publication No. 2003-179632.

SUMMARY

According to one aspect of the embodiment, a selection circuit includes a first storage circuit for storing information of (m×n) bits each corresponding to a choice and indicating whether the corresponding choice is in a selectable state or not. The selection circuit also includes a second storage circuit for storing information of n bits, each corresponding to a bit string having an m-bit width stored in the first storage circuit and indicating whether the corresponding bit string contains a bit indicating that the choice is in selectable state. In addition, a first round robin circuit for executing a round robin process on the second storage circuit is included to select one of the bits contained in the corresponding bit string and indicating that a choice is in selectable state.

A second round robin circuit for executing the round robin process on the bit string having the m-bit width is also included. It corresponds to the bit selected by the first round robin circuit to select one of the bits indicating that the corresponding choice is in a selectable state. Finally, this aspect of the embodiment also includes a control circuit for controlling the first round robin circuit and the second round robin circuit.

The features and advantages of the embodiment may be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 2 is a diagram showing the memory structure of the selection circuit according to the first embodiment;

FIG. 12 is a diagram showing the memory structure of the selection circuit of the packet processing apparatus according to the fifth embodiment.

DESCRIPTION OF EMBODIMENTS

Figure 1:
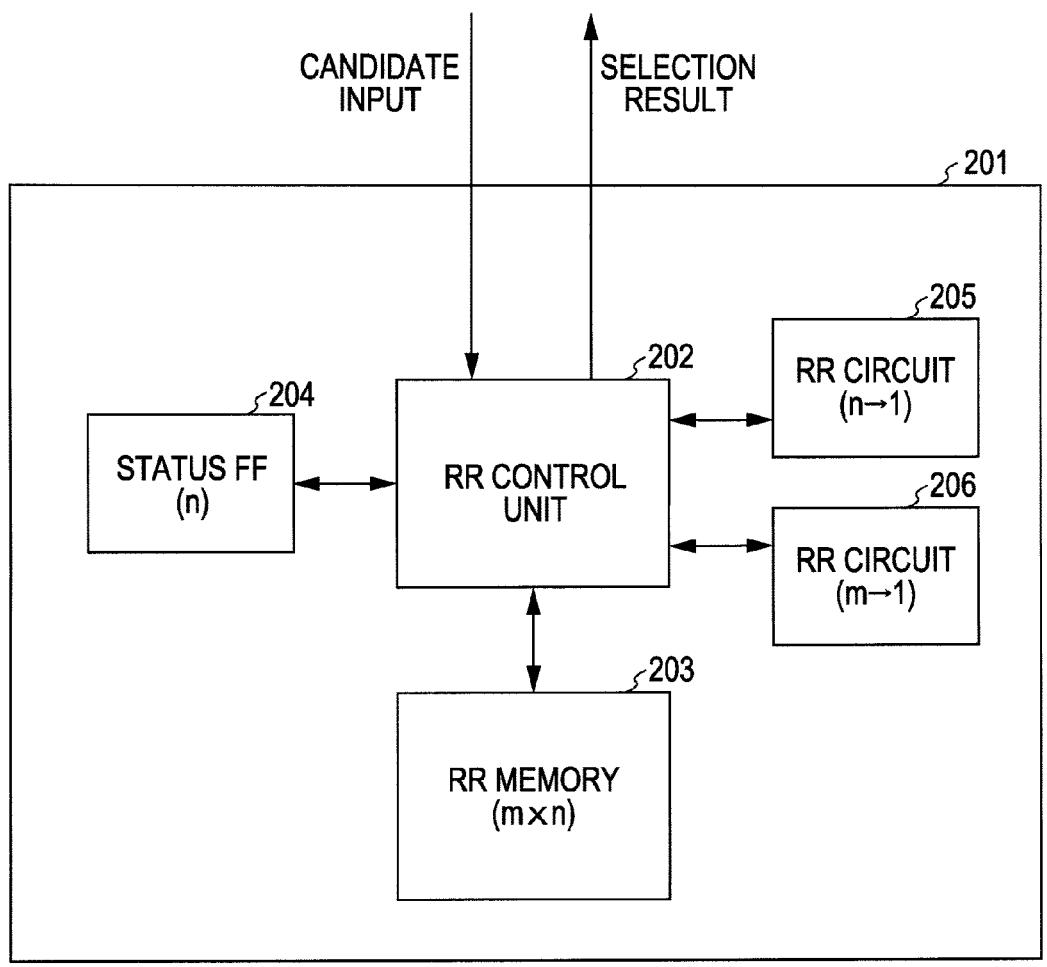
FIG. 1 is a block diagram showing the configuration of the selection circuit according to a first embodiment.

The problem posed by a selection circuit using the round robin circuit is that the size of the logic circuit increases in proportion to the number of the choices to be processed. When the number of choices to be processed increases 16 times and one round robin circuit is used, for example, the number of the gates used increases 16 times.

According to the method disclosed in Japanese Unexamined Patent Publication No. 2003-179632, however, 16 times the round robin circuits are required to account for a 16 time increase. This, of course, increases the size of the logic circuit by about 16 times.

The features and advantages disclosed by the exemplary aspects of the invention are intended to solve the problem described above. Along these lines, the invention provides a selection circuit and a packet processing apparatus operable to suppress the increase in the size of the logic circuit while at the same time dealing with a multiplicity of choices.

In order to solve the problems described above, one aspect of the invention provides a selection circuit and a packet processing apparatus comprising a first storage circuit for storing the information of (m×n) bits, each corresponding to a choice and indicating whether a corresponding choice is in a selectable state or not. Also included is a second storage circuit for storing the information of n bits, each corresponding to a bit string having the m-bit width stored in the first storage circuit and indicating whether the corresponding bit string contains a bit indicating that a choice is in a selectable state or not. A first round robin circuit executes the round robin process on the second storage circuit to select one of the bits included in the corresponding bit string and indicating that a choice is in selectable state. A second round robin circuit also executes the round robin process on the bit string of m-bit width corresponding to the bit selected by the first round robin circuit to select one of the bits indicating that the corresponding choice is in a selectable state. Finally, a control circuit controls the first and second round robin circuits.

In this aspect of the invention, the round robin control operation may be realized by combining the two round robin circuits, and therefore, the increase in the size of the logic circuit can be minimized while at the same time dealing with a multiplicity of choices.

Incidentally, the component elements, expressions and arbitrary combinations of the component elements disclosed herein and used for methods, apparatuses, systems, computer programs, recording media, and data structures are also effectively applicable to solve the aforementioned problem.

The selection circuit and the packet processing apparatus according to this aspect of the invention have the advantage of effectively minimizing the size of the logic circuit while at the same time dealing with a multiplicity of choices.

Now, the selection circuit and the packet processing apparatus according to exemplary embodiments of the invention are explained in detail with reference to the accompanying drawings.

First, the configuration of the selection circuit 201 according to a first embodiment is explained. FIG. 1 is a block diagram showing the configuration of the selection circuit 201. The selection circuit 201 is for sequentially selecting those of (m×n) choices that are in a selectable state, and includes a round robin (hereinafter referred to as "RR") control unit 202, a RR memory 203, a status flip-flop (hereinafter referred to as "status FF" or simply as "FF") 204, a RR circuit 205, and a RR circuit 206.

The RR control unit 202 may realize the RR control operation using a combination of the RR circuit 205 and the RR circuit 206. The exemplary control operation of the RR control unit 202 is described in detail later.

The RR memory 203, according to one aspect, may be a storage circuit for storing the information of (m×n) bits and accessed in units of a bit string of m bits (this bit string is hereinafter referred to also as "the word"). Each bit of the RR memory 203 preferably corresponds to one choice and indicates whether a corresponding choice is selectable or not. Specifically, when the bit value is "1", it indicates that the corresponding choice is selectable, while the bit value "0" indicates that the corresponding choice is not selectable.

The status FF 204 may optionally be a storage circuit for storing the information of n bits. Each bit of the status FF 204 corresponds to one word of the RR memory 203 and indicates whether any of the choices corresponding to the word is selectable or not. Specifically, a bit of the status FF 204 is "0" when all the bits of the corresponding word are "0", and "1" when at least one of the bits of the corresponding word is "1".

It is desirable for the RR circuit 205 to select a bit value of "1" from the bit string of n bits according to the round robin scheme in order to output the bit number of the bit thus selected. Specifically, the RR circuit 205 may be used to select a bit "1" in value from the status FF 204.

The RR circuit 206, on the other hand, selects a bit "1" in value from the bit string of m bits according to the round robin scheme, and outputs the bit number of the bit thus selected. Specifically, the RR circuit 206 may be used to select a bit "1" in value from the word of the RR memory 203 corresponding to the bit of the status FF 204 selected by the RR circuit 205.

The RR circuit 205 and the RR circuit 206 may be combined with each other to realize the RR control operation. In this way, the increase in the size of the logic circuit with the increase in choices can be minimized. Assume, for example, that the choices increase 16 times. It is sufficient to increase each of m and n four times, and therefore, the circuit size of the RR circuits 205 and 206 increases only four times. In other words, even in the case where the choices are increased X times, the size increase of the logic circuit is suppressed to about $\sqrt{X}$.

Next, with reference to specific examples of the RR memory 203 and the status FF 204, the exemplary control operation of the RR control unit 202 is explained in detail. FIG. 2 is a diagram showing the memory structure of the selection circuit 201 according to the first embodiment. As shown in FIG. 2, the RR memory 203 has (m×n) bits each corresponding to one choice. In the RR memory 203, the bit value of "1" indicates that the corresponding choice is selectable.

The status FF 204 may have n bits each indicating whether the corresponding word of the RR memory 203 includes a bit value of "1". In the status FF 204, the bit value of "0" indicates that the corresponding word of the RR memory 203 does not have a bit value of "1".

According to one embodiment, the RR control unit 202 sequentially selects, from the RR memory 203, the bits having a value of "1", i.e., the bits with the corresponding selectable choices. Specifically, assuming that the b-th bit of the a-th word is expressed as (a, b), the RR control unit 202, by sequentially scanning the RR memory 203 in order of (0, 0), (0, 1), (0, 2) . . . , (0, m−1), (1, 0), (1, 1), (1, 2), . . . , (1, m−1), . . . , (n−1, 0), (n−1, 1), (n−1, 2), . . . , (n−1, m−1), selects the bits found to have a value of "1".

In order to realize this control operation, the RR control unit 202 causes the RR circuit 205 to execute the RR process and thereby acquires the bits having a value of "1" from the status FF 204. In this way, by first executing the RR process on the status FF 204, the word having the bit value of "1" can be specified.

Then, the RR control unit 202 causes the RR circuit 206 to execute the RR process and acquires a bit value of "1" from the specified word. After the RR 206 scans all the bits of the word, the RR control unit 202 causes the RR circuit 205 to continue the execution of the RR process and acquires the next bit value of "1" from the status FF 204.

As described above, by combining the RR circuit 205 and the RR circuit 206 with each other, the RR control unit 202 can sequentially acquire the bit values of "1" found by scanning the RR memory 203 in the order described above.

In the case of FIG. 2, the RR control unit 202 acquires the first bit value of "1" from the status FF 204 by causing the RR circuit 205 to execute the RR process. Then, the RR control unit 202 acquires (1, 4) and (1, 8) by causing the RR circuit 206 to execute the RR process on the first word.

Then, the RR control unit 202 acquires the second bit value of "1" from the status FF 204 by causing the RR circuit 205 to continue the execution of the RR process. After that, the RR control unit 202 acquires (2, 2), (2, 5), (2, 6), (2, m−4) and (2, m−3) by causing the RR circuit 206 to execute the RR process on the second word.

Similarly, the RR control unit 202 can sequentially select the bit values of "1" from the RR memory 203.

Figure 3:
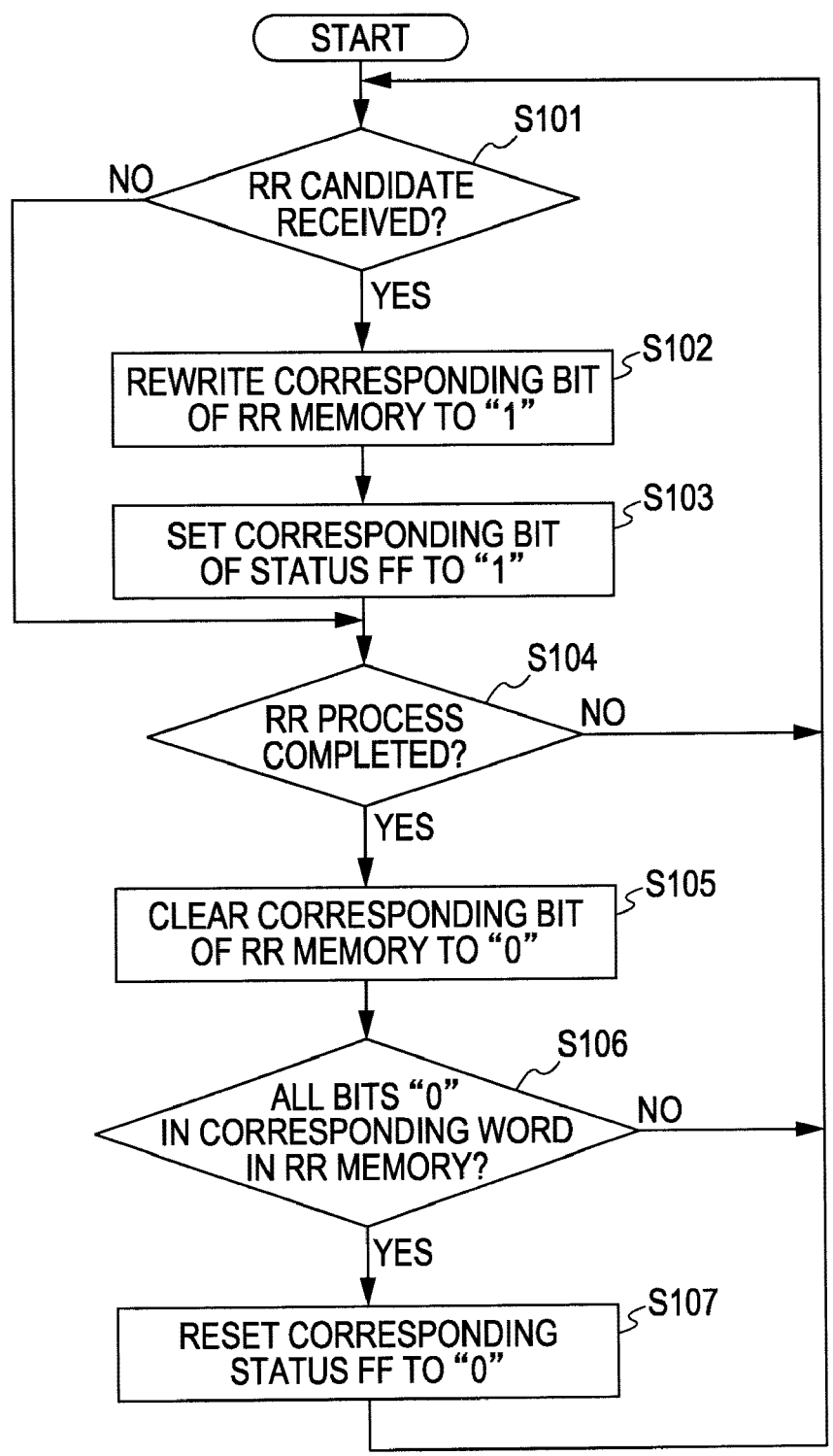
FIG. 3 is a flowchart showing the processing steps of the status update process in the selection circuit according to the first embodiment.

Next, the exemplary processing steps executed by the selection circuit 201 shown in FIG. 1 are explained with reference to a flowchart. FIG. 3 is an exemplary flowchart showing the steps of the status update process in the selection circuit 201. This status update process is normally executed in the selection circuit 201.

The RR control unit 202, upon reception of a new RR candidate, i.e., a notice on a new choice in selectable state (YES in step S101), rewrites the value of the corresponding bit in the RR memory 203 to "1" (step S102). Further, the RR control unit 202 rewrites the bit value of the status FF 204 corresponding to the word containing the particular bit to "1" (step S103).

Also, the RR control unit 202, after acquiring the bit value of "1" from the RR memory 203 upon completion of the RR process and outputting the particular bit number externally as a selection result (YES in step S104), clears the value of the particular bit to "0" (step S105). Once all the bit values of the word containing the particular bit are cleared to "0" (YES in step S106), the RR control unit 202 resets the bit value of the status FF 204 corresponding to the particular word to "0" (step S107).

Subsequently, the RR control unit 202 repeatedly executes the processing steps described above. Although the bit values of the RR memory 203 selected by the RR process are always cleared to "0" in the processing steps described above, the bit values of the RR memory 203 selected at this timing are not necessarily cleared always to "0". Assume, for example, that the choice is a queue storing a plurality of packets and one packet is selected and output. Since other packets remain in the queue, the particular queue is still in a selectable state. In such a case, the corresponding bit value of the RR memory 203 is cleared to "0" after all the packets of the queue are output.

Figure 4:
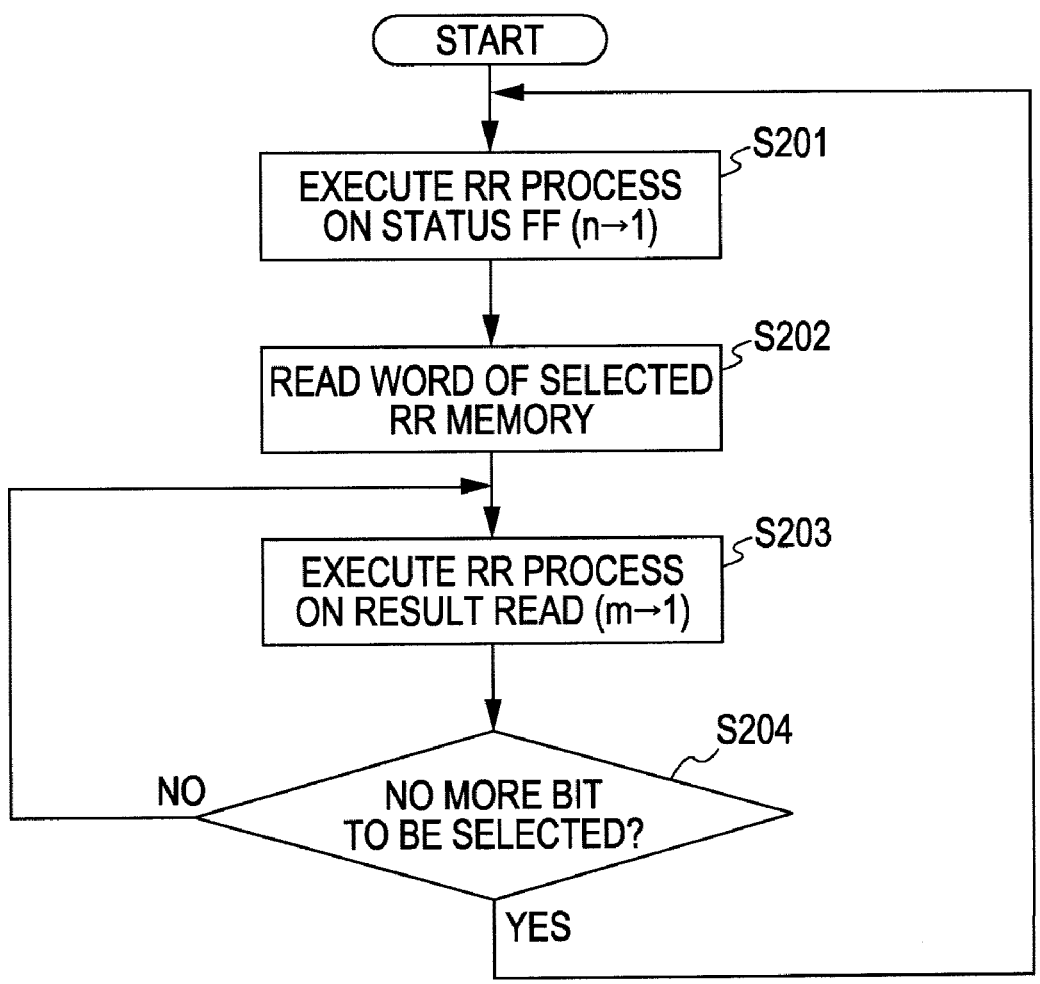
FIG. 4 is a flowchart showing the processing steps of the selection process in the selection circuit according to the first embodiment.

FIG. 4 is an exemplary flowchart showing the processing steps of the selection process executed by the selection circuit 201. This selection process is normally executed by the selection circuit 201 in parallel to the status update process described above.

The RR control unit 202 causes the RR circuit 205 to execute the RR process on the status FF 204 (step S201). Then, the RR control unit 202 reads the word of the RR memory 203 corresponding to the selected bit (step S202).

After that, the RR control unit 202 causes the RR circuit 206 to execute the RR process on the word thus read, and repeats the process of outputting the selected bit number externally as a selection result (step S203). Once the RR circuit 206 has scanned all the bits of the word and no bit remains to be selected (YES in step S204), the RR control unit 202 returns to step S201 and causes the RR circuit 205 to continue the execution of RR process.

As described above, according to the first embodiment, two RR circuits are used in combination, and therefore, even when the choices increase, the increase in the size of the logic circuit can be minimized.

Although the first embodiment represents a case in which the selection circuit is implemented using one RR memory, the selection circuit can alternatively be realized using a plurality of RR memories. This configuration makes possible a versatile operation in which the RR memories may be increased as required to increase the number of choices that can be processed. A second embodiment described below represents an example of realizing such a selection circuit having a plurality of RR memories.

In the description that follows, the component parts equivalent to those explained above are designated by the same reference numerals, respectively, and not described again.

Figure 5:
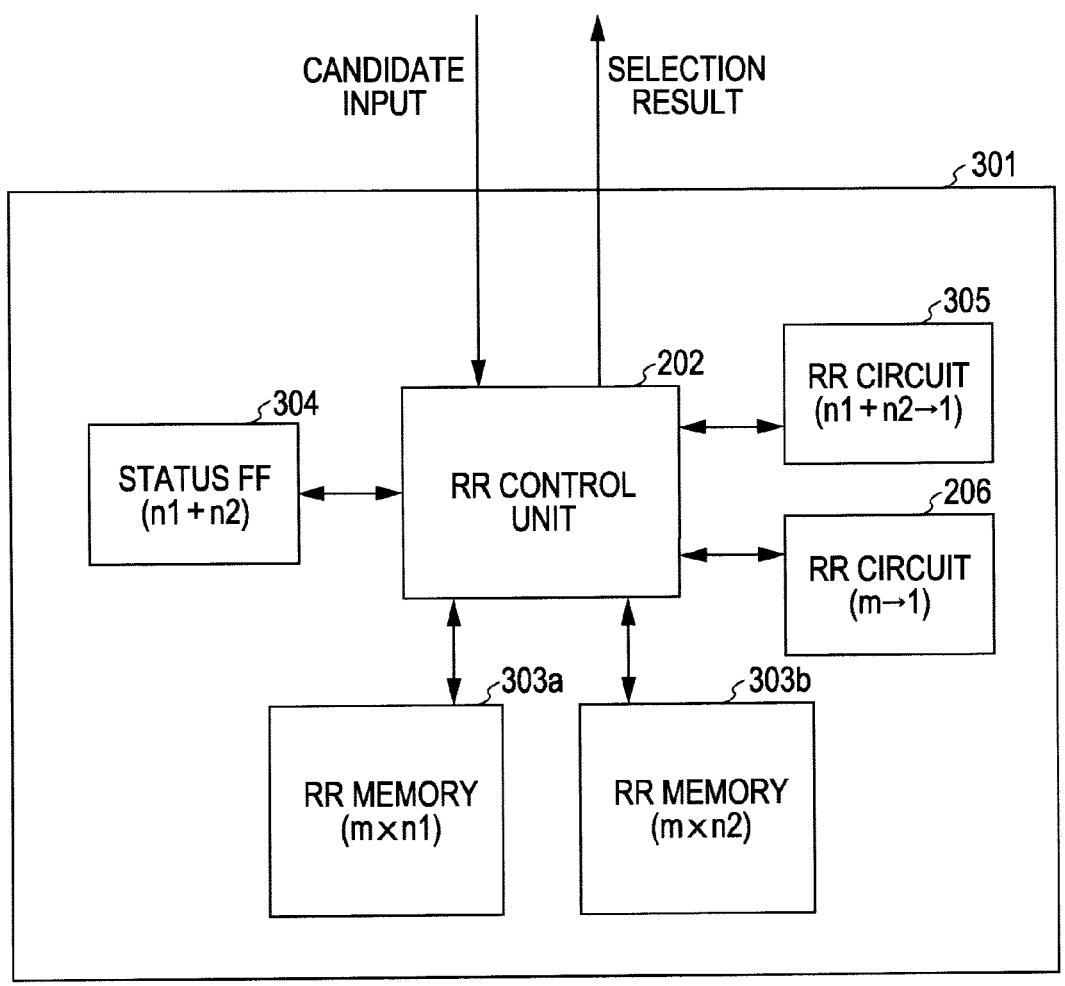
FIG. 5 is a block diagram showing the configuration of the selection circuit according to a second embodiment.

FIG. 5 is a block diagram showing the configuration of the selection circuit 301 according to the second embodiment. The selection circuit 301, which is for sequentially selecting those of the choices in the number of m×(n1+n2) which are in selectable state, includes a RR control unit 202, a RR memory 303*a*, a RR memory 303*b*, a status FF 304, a RR circuit 305, and a RR circuit 206.

The RR memory 303*a*, which is a storage circuit for storing the information of bits in the number of m×n1, is accessed in units of an m-bit string (word). The RR memory 303*b*, on the other hand, is a storage circuit for storing the information of bits in the number of m×n2 and accessed in units of an m-bit string (word). In this way, the selection circuit 301 includes the two RR memories 303, and if choices to be processed are few in number, only one of the RR memories 303 is packaged and used, while both RR memories 303 are packaged and used for the application in which many choices are required to be processed.

The status FF 304, in one aspect, stores the information of bits in the number of n1+n2 in keeping with a case in which both the RR memories 303*a* and 303*b* are used. In the case where one of the RR memories 303*a* and 303*b* is not packaged, all the bits of the status FF 304 corresponding to the RR memory 303 not packaged are set to "0". Therefore, the word of the RR memory 303 not packaged is not subjected to the RR process of the RR circuit 206.

In order to meet the requirement in the case where both the RR memories 303*a* and 303*b* are packaged, the RR circuit 305 selects the bit values of "1" from the bit string of (n1+n2) bits according to the round robin scheme and outputs the bit number of each selected bit. Specifically, the RR circuit 305 is used to select the bit values of "1" from the status FF 304.

As described above, the second embodiment is configured of the status FF 304 and the RR circuit 305 to meet the requirement in the presence of a plurality of RR memories 303, and therefore, the versatile operation is possible in accordance with the number of the choices required.

Unlike in the first embodiment in which all the choices are selected with equal frequency, the selection frequency may alternatively be weighted. A third embodiment explained below represents a case in which the selection frequency is weighted.

Figure 6:
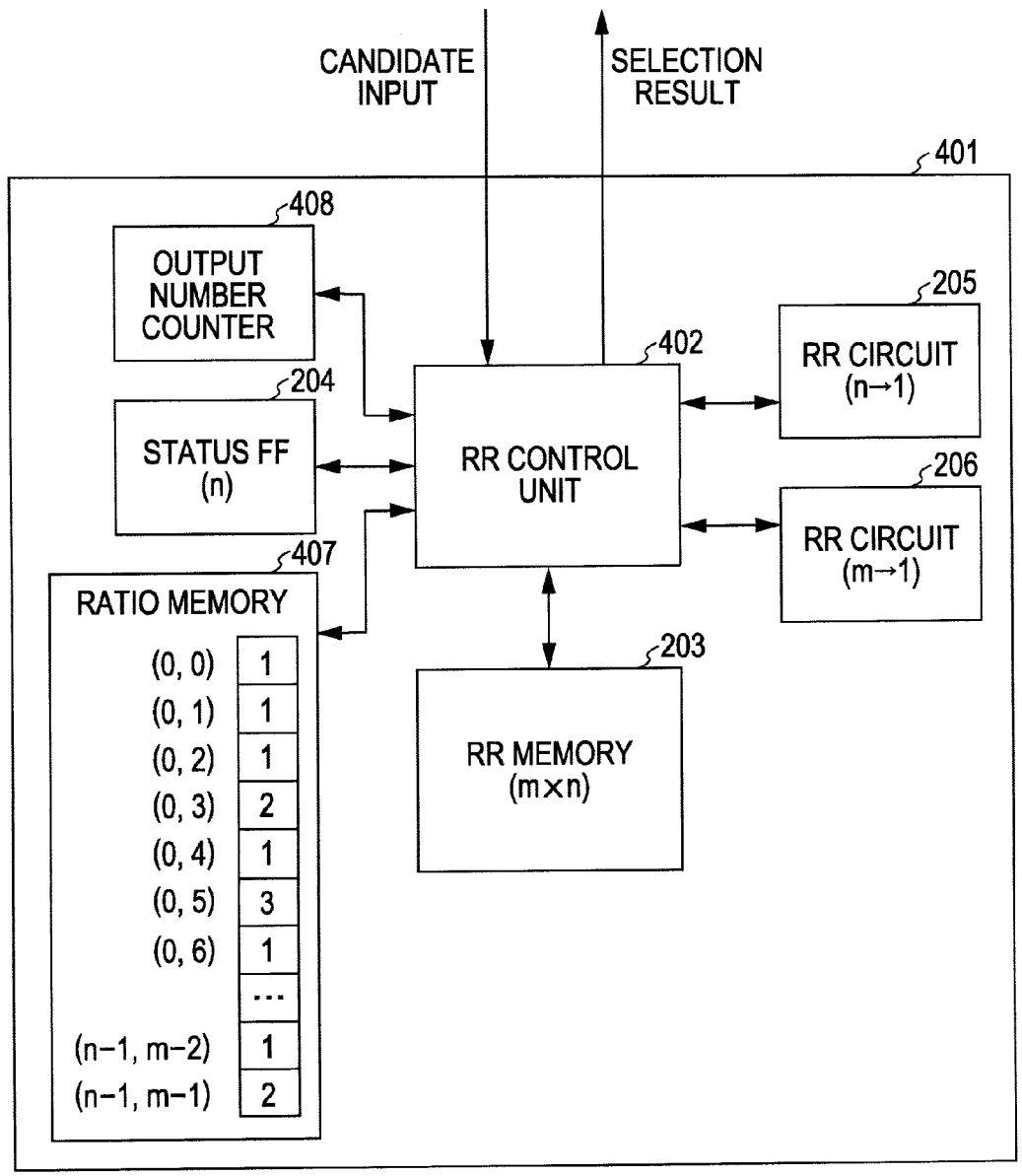
FIG. 6 is a block diagram showing the configuration of the selection circuit according to a third embodiment.

FIG. 6 is a block diagram showing the exemplary configuration of the selection circuit 401 according to the third embodiment. The selection circuit 401 is for sequentially selecting those of (m×n) choices that are in a selectable state, and includes a RR control unit 402, a RR memory 203, a status FF 204, a RR circuit 205, a RR circuit 206, a ratio memory 407, and an output number counter 408.

The ratio memory 407 preferably stores the bit number corresponding to each choice and the selection ratio of the particular choice in correspondence with each other. The selection ratio is set as "1" for a normal selection frequency. In the embodiment shown in FIG. 6, the selection ratio is set to "2" for the choice corresponding to the bit (0, 3), and to "3" for the choice corresponding to the bit (0, 5). This indicates that the selection frequency of the choice corresponding to the bit (0, 3) is twice as large as the normal selection frequency, and the selection frequency of the choice corresponding to the bit (0, 5) three times as large as the normal selection frequency.

The output number counter 408 may store the number of times each bit number selected by the RR circuit 206 is output as the selection result. The value on the output number counter 408 may then be reset to "0" each time a new bit is selected by the RR circuit 206.

The exemplary RR control unit 402 executes the control operation similarly to the RR control unit 202 explained in the first embodiment and outputs, as the selection result, the bit number selected by the RR circuit 206. After that, the RR control unit 402 acquires, from the ratio memory 407, the selection ratio corresponding to the bit number output as the selection result, and compares it with the value on the output number counter 408.

Unless the two values coincide with each other, the RR control unit 402 outputs again, as the selection result, the bit number selected by the RR circuit 206. As a result, the value on the output number counter 408 may be incremented by 1. In this way, the RR control unit 402 outputs, as the selection result, the bit number selected by the RR circuit 206 until the selection ratio defined for each choice comes to coincide with the value on the output number counter 408.

As the result of execution of this control operation by the RR control unit 402, the bit number selected by the RR circuit 206 is output, as the selection result, continuously as many times as the value of the selection ratio set in the ratio memory 407.

Figure 7:
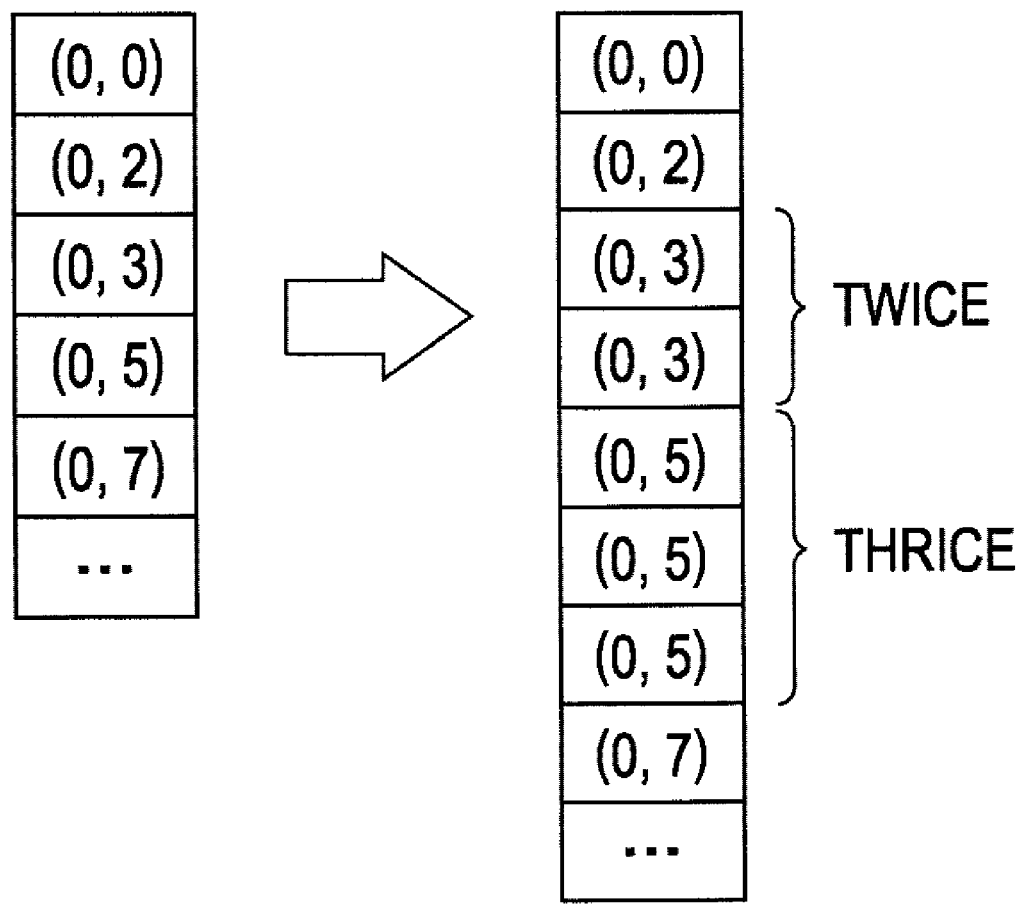
FIG. 7 is a diagram showing an example of the selection result of the selection circuit according to the third embodiment.

When the bits (0, 0), (0, 2), (0, 3), (0, 5), (0, 7) are selected in the order by the RR circuit 206 as shown in FIG. 7, for example, the selection ratios of the bits (0, 3) and (0, 5) being twice and thrice, respectively, the selection circuit 401 outputs the bits (0, 0), (0, 2), (0, 3), (0, 3), (0, 5), (0, 5), (0, 5), (0, 7) as the selection result.

Figure 8:
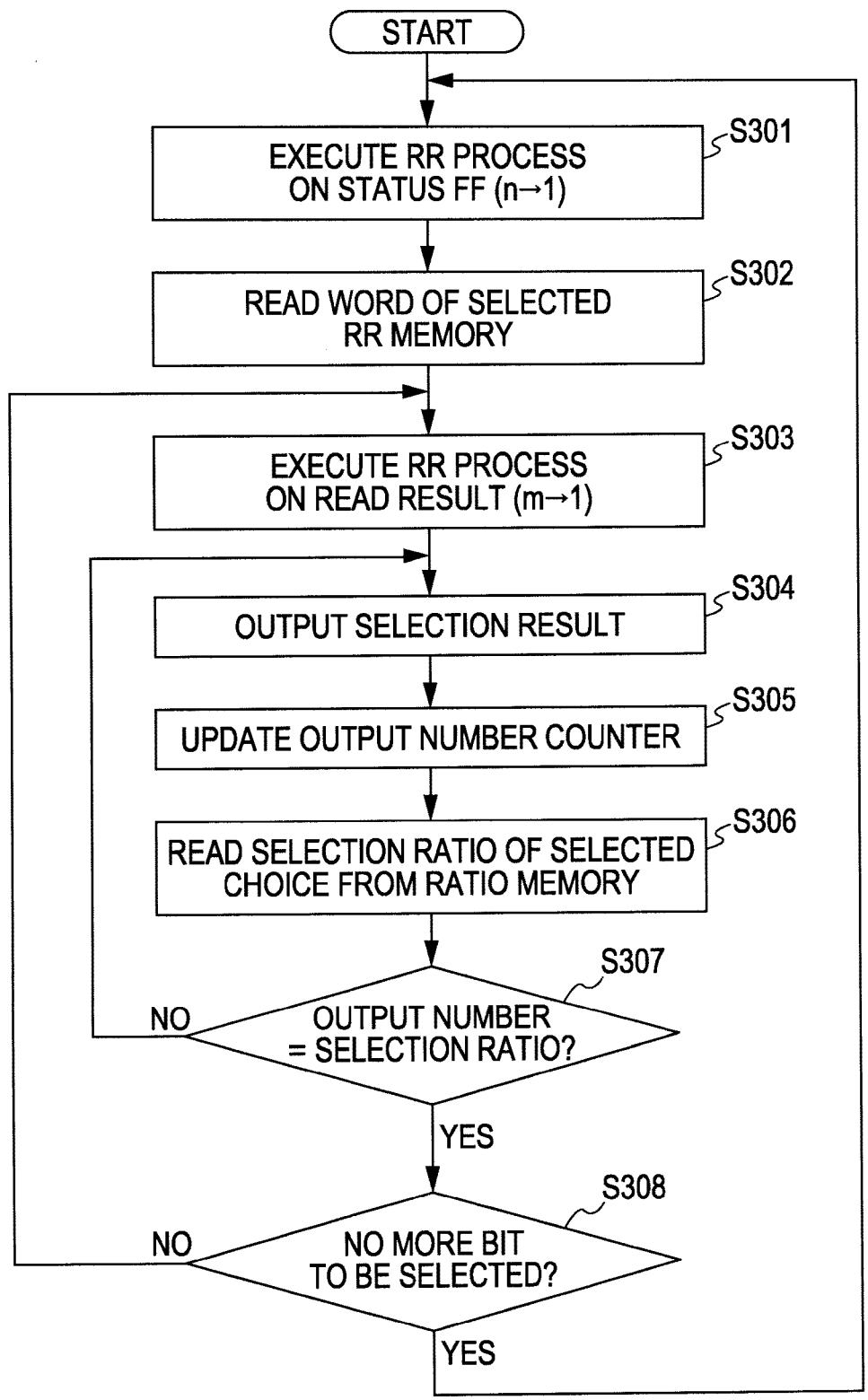
FIG. 8 is a flowchart showing the processing steps of the selection process in the selection circuit according to the third embodiment.

Next, the exemplary processing steps executed by the selection circuit 401 shown in FIG. 6 are explained with reference to a flowchart. FIG. 8 is a flowchart showing the processing steps of the selection process executed by the selection circuit 401. This selection process is preferably executed normally by the selection circuit 401 in parallel to the status update process shown in FIG. 3.

It is desirable for the RR control unit 402 to cause the RR circuit 205 to execute the RR process on the status FF 204 (step S301). Then, the RR control unit 402 reads the word of the RR memory 203 corresponding to a selected bit (step S302).

Then, the RR control unit 402 causes the RR circuit 206 to execute the RR process on the word that has been read (step S303), and outputs the selected bit number externally as the selection result (step S304). As a result, the value on the output number counter 408 may be updated (step S305).

According to one embodiment, the RR control unit 402 acquires, from the ratio memory 407, the selection ratio corresponding to the bit number of the bit output as the selection result (step S306). When the value on the output number counter 408 fails to coincide with the selection ratio (NO in step S307), the RR control unit 402 returns to step S304 and outputs the selection result again.

When the value on the output number counter 408 coincides with the selection ratio (YES in step S307) while all the bits of the word are not yet scanned by the RR circuit 206 (NO in step S308), the RR control unit 402 resumes the process from step S303. If, for example, all the bits of the word are scanned by the RR circuit 206 and there remains no bit to be selected (YES in step S308), on the other hand, the RR control unit 402 returns to step S301 and causes the RR circuit 205 to continue the execution of the RR process.

As described above, according to the third embodiment, the selection frequency of each choice is controlled based on the selection ratio defined for each choice, and therefore, the preferential control operation may be realized in the selection of the choices.

Unlike in the aforementioned case in which the selected bit number is output unconditionally as the selection result as many times as the selection ratio, consideration may also be given as to whether each choice is in a selectable state or not. When the selection ratio corresponding to a given bit is "10" and the corresponding choice becomes impossible to select when the particular bit number is output three times as the selection result, then the output of the particular bit number may be suspended.

Although the first embodiment represents a case in which the functions of two RR circuits are used in combination, the functions of the two RR circuits shown in the first embodiment can alternatively be executed by a single RR circuit. In a fourth embodiment, an explanation is given for a situation in which the RR process on the status FF and the word are realized with a single RR circuit.

Figure 9:
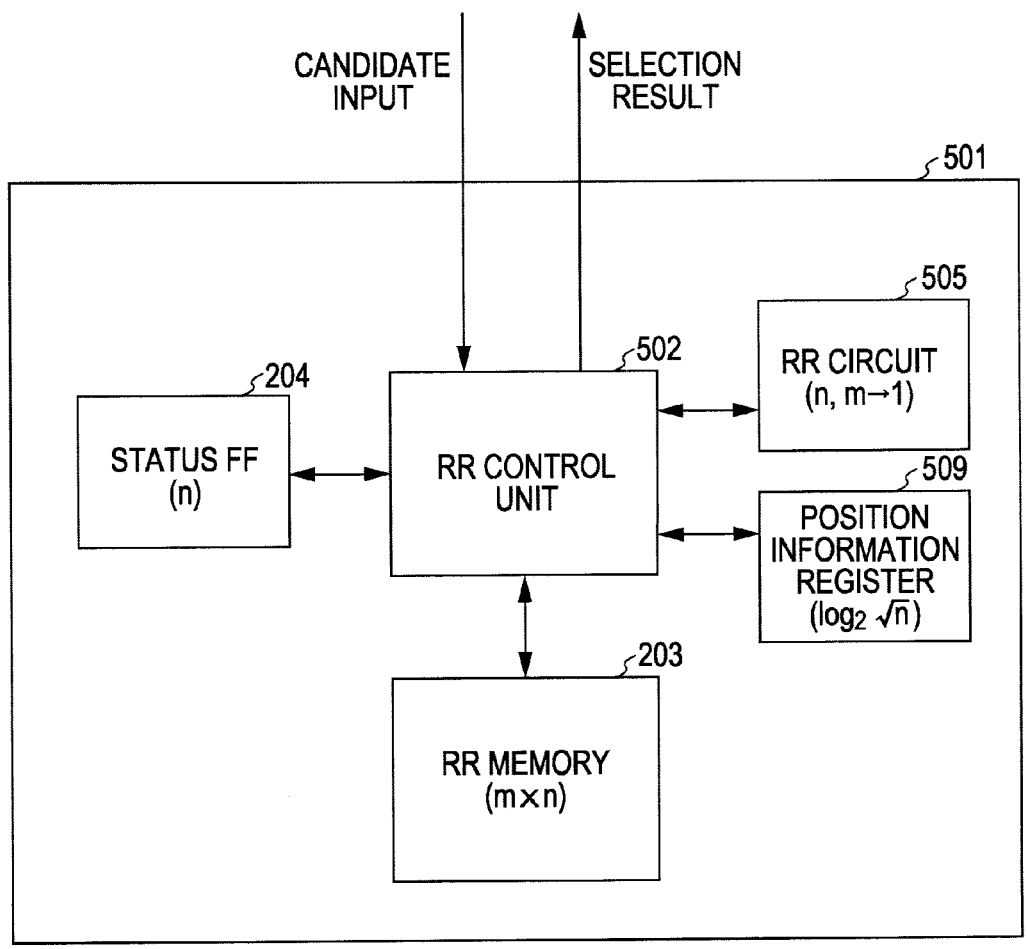
FIG. 9 is a block diagram showing the configuration of the selection circuit according to a fourth embodiment.

FIG. 9 is an exemplary block diagram showing the configuration of the selection circuit 501 according to the fourth embodiment. The selection circuit 501 is for sequentially selecting those of (m×n) choices which are in a selectable state, and includes a RR control unit 502, a RR memory 203, a status FF 204, a RR circuit 505, and a position information register 509.

The RR circuit 505 selects the bit value of "1" from the bit string of n or m bits according to the round robin scheme, and outputs the selected bit number. Specifically, the RR circuit 505 may be used to select the bit value of "1" from the status FF 204. The RR circuit 505 is also used to select the bit value of "1" from the word read from the RR memory 203.

One aspect of the RR circuit 505, which is configured to retrieve the bit value of "1" following the previously selected bit, stores only one position of the selected bit. When the RR process is started for a choice B during the execution of the RR process for a choice A, therefore, the previously selected bit for the choice A becomes unknown, and the appropriate RR control operation may fail to be performed.

In view of this, the RR control unit 502 may cause the RR circuit 505 to execute the RR process and, for the status FF 204, may store the position of the selected bit in the position information register 509. Then, when causing the RR circuit 505 to execute the RR process again for the status FF 204, the RR control unit 502 designates the next bit to the value in the position information register 509 as the starting point of executing the RR process by the RR circuit 505.

Since the position of the bit selected by executing the RR process for the status FF 204 is stored in the position information register 509 as described above, the RR process for the status FF 204 may be appropriately executed with a single RR circuit.

Incidentally, with regard to the RR memory 203, all the bits, from head to tail, are preferably scanned continuously, and therefore, the position of the selected bit is not required to be stored. Also, the position information register 509 may have a capacity sufficient to store the values 0 to n−1, i.e., the capacity of at least $\log_2 n$ bits.

Figure 10:
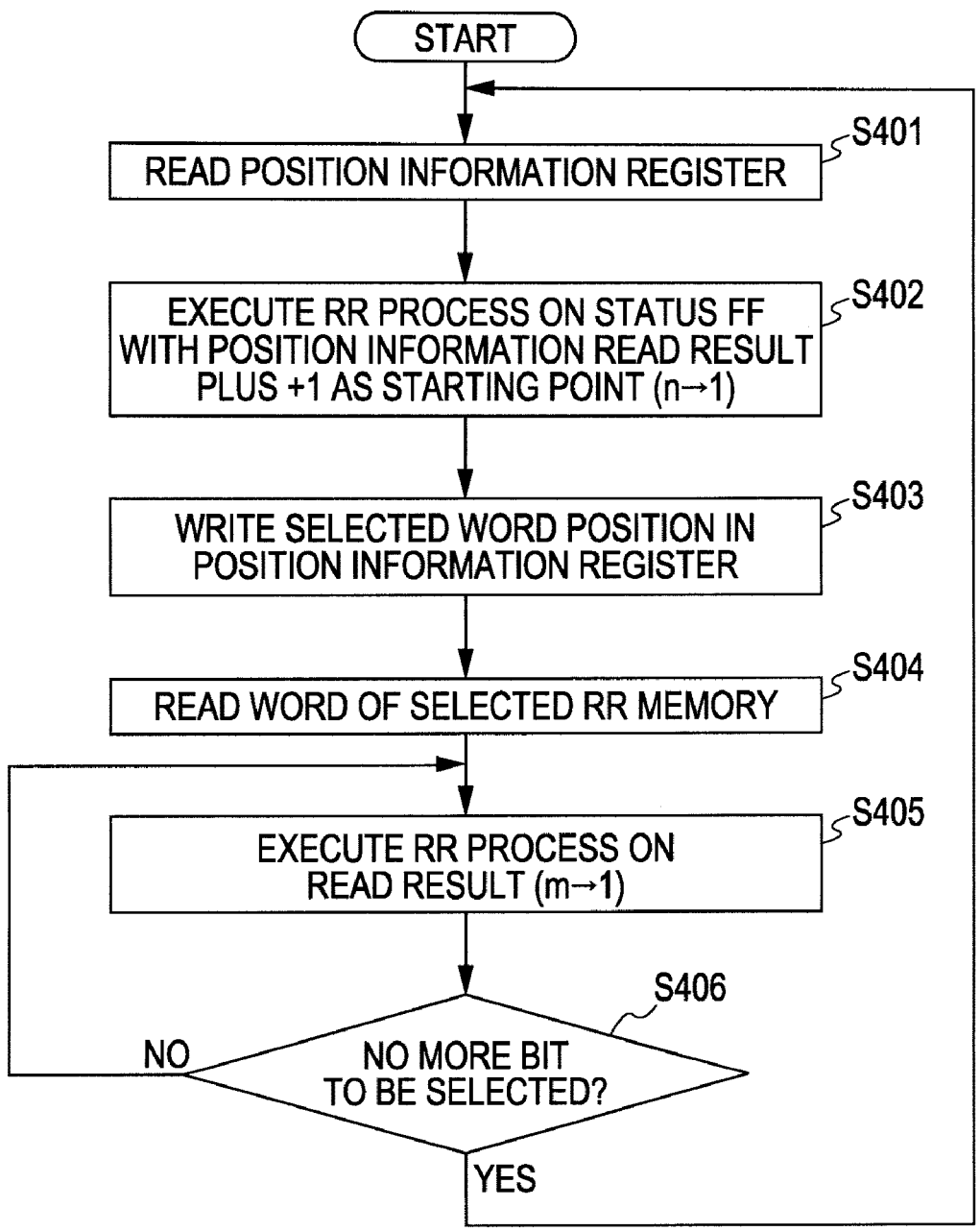
FIG. 10 is a flowchart showing the processing steps of the selection process in the selection circuit according to the fourth embodiment.

Next, the exemplary processing steps executed by the selection circuit 501 shown in FIG. 9 are explained with reference to a flowchart. FIG. 10 is a flowchart showing one embodiment of the processing steps of the selection process executed by the selection circuit 501. This selection process is normally executed by the selection circuit 501 in parallel to the status update process shown in FIG. 3.

The RR control unit 502 reads the value of the position information register 509 (step S401), and by designating the particular value plus 1 as a starting position, causes the RR circuit 505 to execute the RR process on the status FF 204 (step S402). Then, it is desirable for the RR control unit 502 records the selected bit number in the position information register 509 (step S403), and reads the word of the RR memory 203 corresponding to the selected bit (step S404).

The RR control unit 502 may then repeat the process of causing the RR circuit 505 to execute the RR process on the word that has been read in order to output the selected bit number as a selection result externally (step S405). Once the RR circuit 505 has scanned all the bits of the word and no bit remains to be selected (YES in step S406), the RR control unit 502 resumes the process from step S401.

As described above, according to the fourth embodiment, the bit selected by the RR process for the status FF 204 is preferably recorded in the position information register 509. Therefore, only one RR circuit may be used and the size of the logic circuit can be further reduced.

A fifth embodiment described below represents an application of the aforementioned selection circuit to the packet processing apparatus. Although the first embodiment represents an application of the selection circuit 201 according to the first embodiment to the packet processing apparatus, the selection circuits shown in the other embodiments are similarly applicable to the packet processing apparatus.

Figure 11:
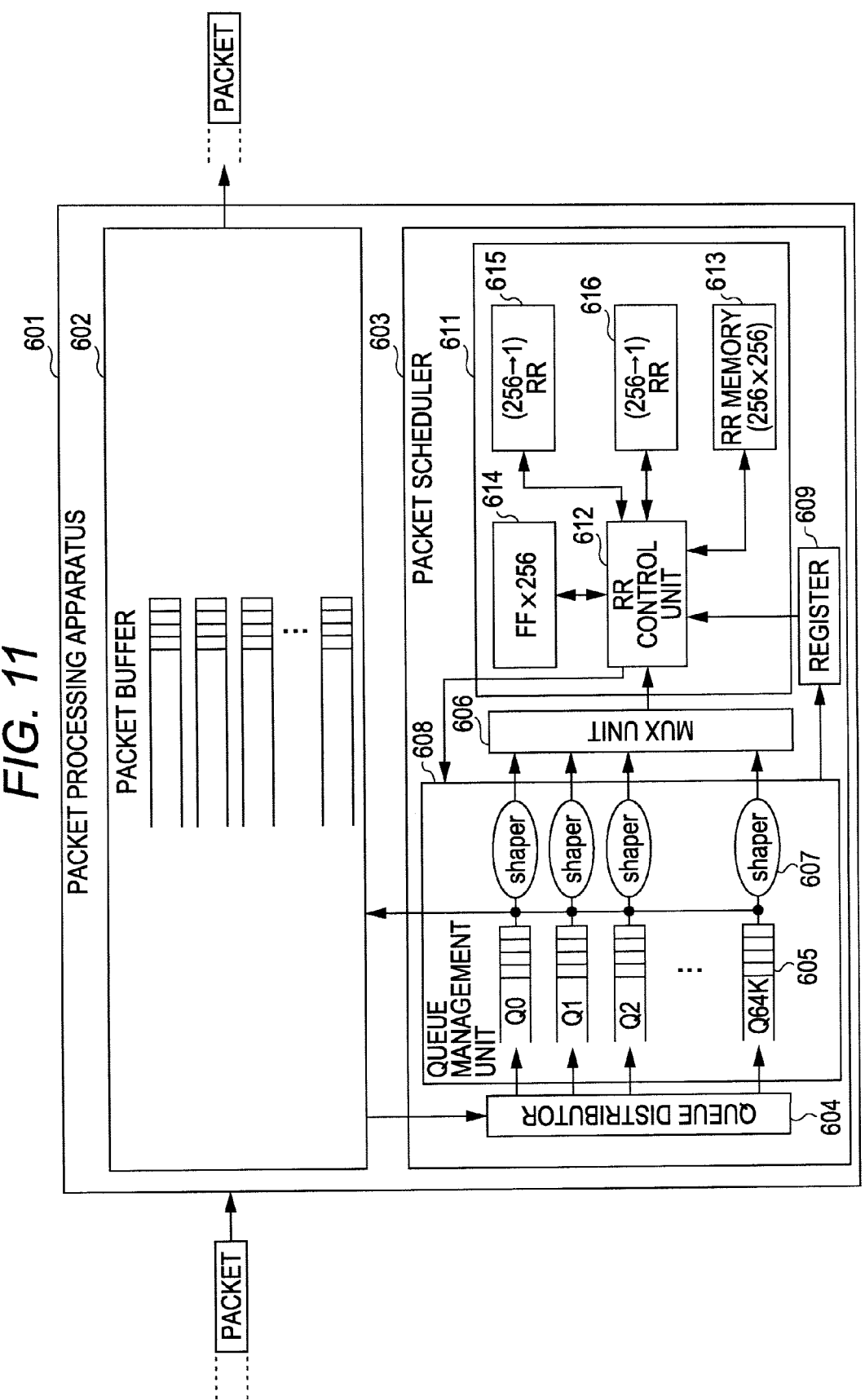
FIG. 11 is a block diagram showing the configuration of the packet processing apparatus according to a fifth embodiment.
Figure 13:
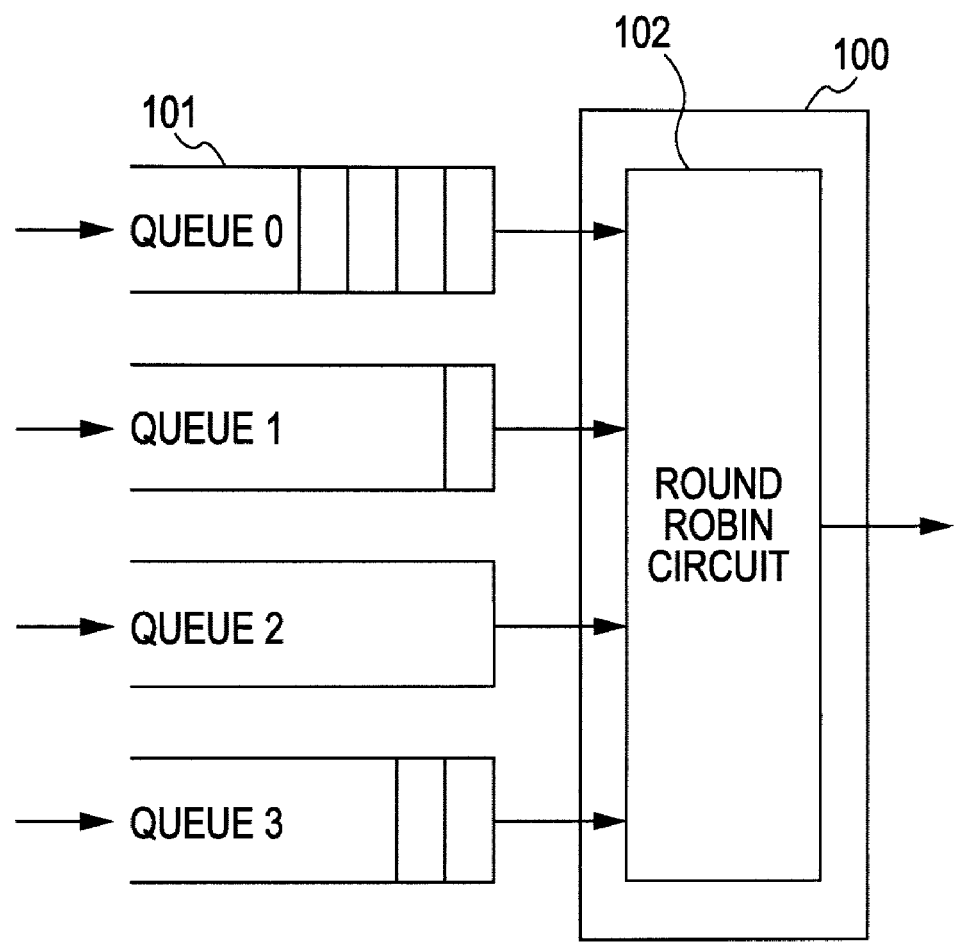
FIG. 13 is a diagram showing an example of the conventional selection circuit.

FIG. 11 is an exemplary block diagram showing the configuration of the packet processing apparatus 601 according to the fifth embodiment. FIG. 12 is a diagram showing the exemplary memory structure of the selection circuit 611 of the packet processing apparatus 601 according to the fifth embodiment. In one aspect, the packet processing apparatus 601 is a communication apparatus for band control operation, and includes a packet buffer 602 and a packet scheduler 603. It is desirable for the packet buffer 602 holds the received packets in queues, and outputs the packets in response to the command from the packet scheduler 603.

Assume that the packet processing apparatus 601 accommodates 256 user names and controls the band for 256 types of services for each user. To realize this band control operation, the queue management unit 608 of the packet scheduler 603 has (256×256), i.e., 65536 (64K) queues 605 and shapers 607 corresponding to each queue 605. The selection circuit 611 of the packet scheduler 603 may then selects one of the queues 605 that can be output.

The packet processing apparatus 601, upon reception of a packet, stores the received packet in the packet buffer 602. Further, the packet processing apparatus 601 acquires an 8-bit user ID and an 8-bit service ID from the header information of the received packet, and notifies the queue distributor 604 of the packet scheduler 603. In the process, the packet processing apparatus 601 notifies, in addition to the user ID and the service ID, the queue distributor 604 of the length of the packet received and the storage address indicating the position at which the packet is stored in the packet buffer 602.

The queue distributor 604 preferably stores the notified packet length and storage address in the queue 605 corresponding to the notified combination of the user ID and service ID. Each shaper 607 executes the band control operation based on the information stored in the corresponding queue 605, and in the case where the packet can be output, notifies the queue number of the corresponding queue 605 to the MUX unit 606 as a selection candidate.

According to on embodiment, the queue number is a 16-bit value of any one of 0 to 65553, in which the most significant eight bits correspond to the user ID and the least significant eight bits to the service ID. The MUX unit 606 multiplexes the queue numbers notified from the shapers 607 and preferably outputs it to the selection circuit 611. It is desirable for the queue numbers to be multiplexed on the first-come first-served basis.

The RR control unit 612 of the selection circuit 611 sets "1" as the bit of the RR memory 613 corresponding to the notified queue number. The RR memory 613 may be a storage circuit for storing the information of 65536 (64K) bits each corresponding to any one of the queue numbers, and accessed in units of the word having the width of 256 bits. Then, the RR control unit 612, as shown in FIG. 12, handles the most significant eight bits of the queue number corresponding to the user ID as a value indicating the word number in order to specify the bit of the RR memory 613 corresponding to the queue number. Also, the RR control unit 612 handles the least significant eight bits of the queue number corresponding to the service ID as a value indicating the number of the bit in the word.

The RR control unit 612, in setting "1" in the bit of the RR memory 613, provisionally reads the word containing the bit to be updated, so as not to overwrite the value of other bits. The word thus read is subjected to the logic OR operation and only the bit to be updated is rewritten, after which the particular word is written back to the RR memory 613.

After setting "1" in the bit of the RR memory 613 corresponding to the notified queue number, the RR control unit 612 sets "1" in the bit of the status FF 614 corresponding to the word containing the bit set to "1".

When "0104 (hexadecimal number)" is designated as the queue number, for example, the RR control unit 612 sets "1" in the bit second from top and fifth from left in the RR memory 613 shown in FIG. 12, and sets "1" in the bit second from top in the status FF 614.

In the selection circuit 611, the selection process is preferably executed in parallel to the status update process described above. Specifically, the RR circuit 615 executes the RR process on the status FF 614 to select the bit value of "1". Then, the RR circuit 616 executes the RR process on the word selected by the RR circuit 615 to continue the selection of the bit value of "1". Incidentally, the RR control operation performed by combining the RR circuits 615 and 616 is already explained in detail and is not repeated.

The selection circuit 611 preferably notifies the queue management unit 608 of the queue number corresponding to the bit of the RR memory 613 selected by the RR circuit 616. When the bit second from top and fifth from left in the RR memory 613 shown in FIG. 12 is selected, for example, the selection circuit 611 notifies "0104 (hexadecimal number)" to the queue management unit 608 as the queue number.

The queue management unit 608, upon reception of the notice on the queue number from the selection circuit 611, retrieves the packet length and the storage address from the queue 605 corresponding to the particular queue number, and notifies the retrieved storage address to the packet buffer 602.

The packet buffer 602, upon reception of the notice on the storage address from the queue management unit 608, retrieves and sends out the packet stored at the position of the storage address. This operation realizes the band control operation using the selection circuit 611 in the packet processing apparatus 601.

Incidentally, each queue 605 of the queue management unit 608 can store a plurality of packet lengths and storage addresses. When the RR circuit 616 executes the RR process and selects a given bit in the RR memory 613, therefore, the packet length and the storage address may remain in the queue 605 corresponding to the particular bit even after the packet length and the storage address are retrieved from the particular queue 605.

If, for instance, the value of the bit selected by the RR circuit 616 is unconditionally reset to "0", the packet length and the storage address remaining in the corresponding queue 605 may fail to be selected. In the queue management unit 608, therefore, the number of the combinations of the packet length and the storage address stored in the queue 605 is set in the register 609 for each queue number. Then, when a bit is selected by the RR circuit 616, the RR control unit 612 judges whether the particular bit is to be reset to "0" or not with reference to the register 609.

Specifically, the RR control unit 612 may determine the queue number corresponding to the bit selected by the RR circuit 616, and the number of combinations of the packet length and the storage address stored in the queue 605 corresponding to the particular queue number is acquired from the register 609. When the number thus acquired is "1", the present selection should empty the queue 605, and therefore, the value of the bit selected by the RR circuit 616 is reset to "0". If the number acquired is "2" or more, on the other hand, the queue 605 is not emptied by the present selection, and therefore, the value of the bit selected by the RR circuit 616 is not reset to "0".

All examples and conditional language recited herein are intended for pedagogical purposes to aid the reader in understanding the principles of the invention and the concepts contributed by the inventor to furthering the art, and are to be construed as being without limitation to such specifically recited examples and conditions. Additionally, the organization of such examples in the specification does not relate to a showing of the superiority and inferiority of the invention.

Although the embodiment(s) of the present invention(s) has(have) been described in detail, it should be understood that the various changes, substitutions, and alterations could be made hereto without departing from the spirit and scope of the invention.

Moreover, although the invention may be described separately in terms of various aspects, examples, and embodiments, those skilled in the art will understand that the application is arranged in such a manner to facilitate the description of the present invention. Accordingly, aspects, examples, and embodiments described separately may be combined, in whole or in part, as desired for a particular application.

The invention claimed is:

1. A selection circuit comprising:
   a first storage circuit that stores information of (m×n) bits each corresponding to a unique queue and indicating whether the corresponding unique queue is in a selectable state or not;
   a second storage circuit that stores information of n bits each corresponding to a first word having an m-bit width stored in the first storage circuit and indicating whether the corresponding first word contains a bit indicating that the unique queue is in the selectable state;
   a first round robin circuit for executing a round robin process on the second storage circuit to select a first bit of the n bits, wherein the first bit indicates that a corresponding second word of the first word contains a second bit indicating that the unique queue is in the selectable state; and
   a second round robin circuit for executing the round robin process on the second word to select the second bit.

2. The selection circuit according to claim 1, wherein the control circuit controls the second round robin circuit in such a manner that all the bits indicating that the corresponding unique queue is in the selectable state are selected from the hit string having the m-bit width corresponding to a given bit each time the particular bit is selected by the first round robin circuit.

3. The selection circuit according to claim 1, wherein the first storage circuit is configured by combining a plurality of storage circuits.

4. The selection circuit according to claim 1, wherein the control circuit controls selection frequency selected by each bit of the first storage circuit based on setting information stored in advance.

5. The selection circuit according to claim 1, wherein the second round robin circuit doubles as the first round robin circuit, and
   the second round robin circuit causes the second storage circuit to store, in a register, a position of the bit selected by the round robin process executed on the second storage circuit, and in a next session of the round robin process executed on the second storage circuit, the round robin process is started from the bit immediately following the position stored in the register.

6. The selection circuit according to claim 1, wherein when a bit is selected by the second round robin circuit, the control circuit updates the particular bit so that the corresponding bit string contains a bit indicating that a choice is not in the selectable state.

7. A packet processing apparatus comprising a plurality of queues storing packets and a selection circuit for selecting one of the plurality of queues which outputs a packet,
   wherein the selection circuit includes:
   a first storage circuit that stores information of (m×n) bits each corresponding to unique one of the plurality of queues and indicating whether the corresponding unique queue is in a state adapted to output a packet or not;
   a second storage circuit that stores the information of n bits each corresponding to a first word having an m-bit width stored in the first storage circuit and indicating whether the corresponding first word contains a bit indicating that a packet is adapted to be output;
   a first round robin circuit for executing a round robin process on the second storage circuit to select a first bit of the n bits, wherein the first bit indicates that a corresponding second word of the first word contains a second bit indicating that the packet is in a state adapted to be output; and
   a second round robin circuit for executing the round robin process on the second word to select the second bit.

8. The packet processing apparatus according to claim 7, wherein the control circuit controls the second round robin circuit so that each time a bit is selected by the first round robin circuit, all the bits indicating that the corresponding queue is in a state adapted to output a packet are selected from the bit string having the m-bit width corresponding to the particular bit.

9. The packet processing apparatus according to claim 8, wherein the first storage circuit is configured of a combination of a plurality of storage circuits.

10. The packet processing apparatus according to claim 7, wherein the control circuit, based on setting information stored in advance, controls selection frequency at which each bit of the first storage circuit is selected.

11. The packet processing apparatus according to claim 7, wherein the second round robin circuit doubles as the first round robin circuit, and
    the second round robin circuit causes the second storage circuit to store, in a register, a position of the bit selected by the round robin process executed on the second storage circuit, and in a next session of the round robin process execution on the second storage circuit, starts the round robin process from the bit immediately following the position stored in the register.

12. The packet processing apparatus according to claim 7, wherein if a bit is selected by the second round robin circuit, the control circuit updates the particular bit in such a manner as to indicate that a choice is not in a selectable state in the corresponding bit string.

* * * * *